Feb. 17, 1970 R. D. SANTEE 3,496,552

DEJITTERING CIRCUIT WITH PHASE-LOCK OSCILLATOR

Filed Dec. 22, 1967 4 Sheets-Sheet 1

INVENTOR.
Robert D. Santee
BY
James J. Jennings, Jr.
Attorney

INVENTOR.
Robert D. Santee
BY
James J. Jennings, Jr.
Attorney

Feb. 17, 1970 R. D. SANTEE 3,496,552

DEJITTERING CIRCUIT WITH PHASE-LOCK OSCILLATOR

Filed Dec. 22, 1967 4 Sheets-Sheet 3

INVENTOR.
Robert D. Santee
BY
James J. Jennings Jr.
Attorney

DEJITTERING CIRCUIT WITH PHASE-LOCK OSCILLATOR

Filed Dec. 22, 1967 4 Sheets-Sheet 4

INVENTOR.
Robert D. Santee
BY
James J. Jennings Jr.
Attorney

United States Patent Office
3,496,552
Patented Feb. 17, 1970

3,496,552
DEJITTERING CIRCUIT WITH PHASE-LOCK OSCILLATOR

Robert D. Santee, Orange, Calif., assignor to Borg-Warner Corporation, Chicago, Ill., a corporation of Illinois Filed Dec. 22, 1967, Ser. No. 692,824
Int. Cl. G06f *1/04*
U.S. Cl. 340—172.5 7 Claims

ABSTRACT OF THE DISCLOSURE

Clock and data signals recovered from a magnetic tape are subject to jitter caused by the digital clock rate modulation. Clock rate frequency modulation is absorbed in a temporary storage register. The data is gated out under the control of a phase-lock oscillator which receives two input signals, one denoting the rate at which data is clocked into the storage resgister and the other denoting the rate at which data is gated out of the register. Only slow clock rate variations are tracked by the phase-lock oscillator and thus the data output is not subject to the substantial jitter on the signals as recovered from the tape.

BACKGROUND OF THE INVENTION

In some acquisition systems information is recorded as pulses or "bits" on a magnetic tape. Such a system might be used, by way of example, in a tape recorder on board a satellite, rocket or other analogous unit which gathers external information, or the internal performance of which is recorded as the information signal. Conventionally this technique is termed Pulse Code modulation (PCM) recording. However there may be aberrations in the system which drives the motor in the recorder when the data is "read out" or recovered from the tape and transmitted via a telemetry system to associated monitoring equipment. The data pulses upon recovery from the magnetic tape are subject to "jitter," which may be defined genreally as a difference in time between the instant in which the data pulse actually occurs as it is read out from the tape recorder and the instant at which the data pulse would have occurred if the data rate were steady and not subject to time variations caused by imperfect operation of the components such as the mechanical drive system in the tape recorder.

The Standards for Telemetry promulgated by the IRIG (Inter-Range Instrumentation Group) specify that for satisfactory data transmission the allowable bit jitter, over a time period which is ten times the period of a positive data transfer or bit period, is plus or minus ten percent of a bit period. This stringent requirement formerly could not be satisfied at normal bit or data rates because of fundamental limitations in both the mechanical construction and assembly methods of the tape transports. One significant step forward in the production of a tape transport which can satisfy this arrangement, was made by providing a temporary storage register and regulating (through a control circuit) the speed of the motor in the tape transport as a function of the respective rates at which data is clocked into and read out from the storage register. Details of this improved system are disclosed and claimed in the application of John E. Coolidge and John F. Kinkel entitled "Data Transfer System," filed June 3, 1966, having Ser. No. 555,189, and assigned to the assignee of this invention. However when the tape transport motor is included in the closed loop control system, it is not feasible to utilize this effective system when there must be a time delay in the operation of the system. Such a time delay requirement is imposed in systems where, for example, a missile is fired from an underwater location and the data can only start to be transmitted after the missile surfaces. The present invention is thus directed to a data acquisition and read out system which both satisfies the stringent IRIG standards and simultaneously affords operation in the time-delay mod described above.

SUMMARY OF THE INVENTION

The present invention is a dejittering system connected to receive clock signals and data signals from a magnetic tape. A storage register is connected to receive these signals from the tape, and a tape clock counter circuit is connected to receive the clock signals from the tape and to produce a phase-lock reference signal. A tape clock gate circuit is connected to receive this phase-lock reference signal, also to receive the clock signals from the tape, and to apply an output signal to the storage register. A phase-lock oscillator is connected to receive the phase-lock reference signal and to apply an output synchronizing signal to an output clock gate circuit which in turn applies an output signal to the storage register. An output clock counter circuit is connected to receive the synchronizing signal from the phase-lock oscillator, and to apply a phase-lock feedback signal to the output clock gate circuit and to the phase-lock oscillator. Circuit means, which may include a digital race circuit but may also utilize other such arrangements or even a simple conductor, is connected to pass the data signals from said storage register over an output circuit.

THE DRAWINGS

The best mode contemplated for making and using the invention will be described in connection with the accompanying drawings, in which like reference numerals identify like elements and in which.

GENERAL SYSTEM ARRANGEMENT

Figure 1:
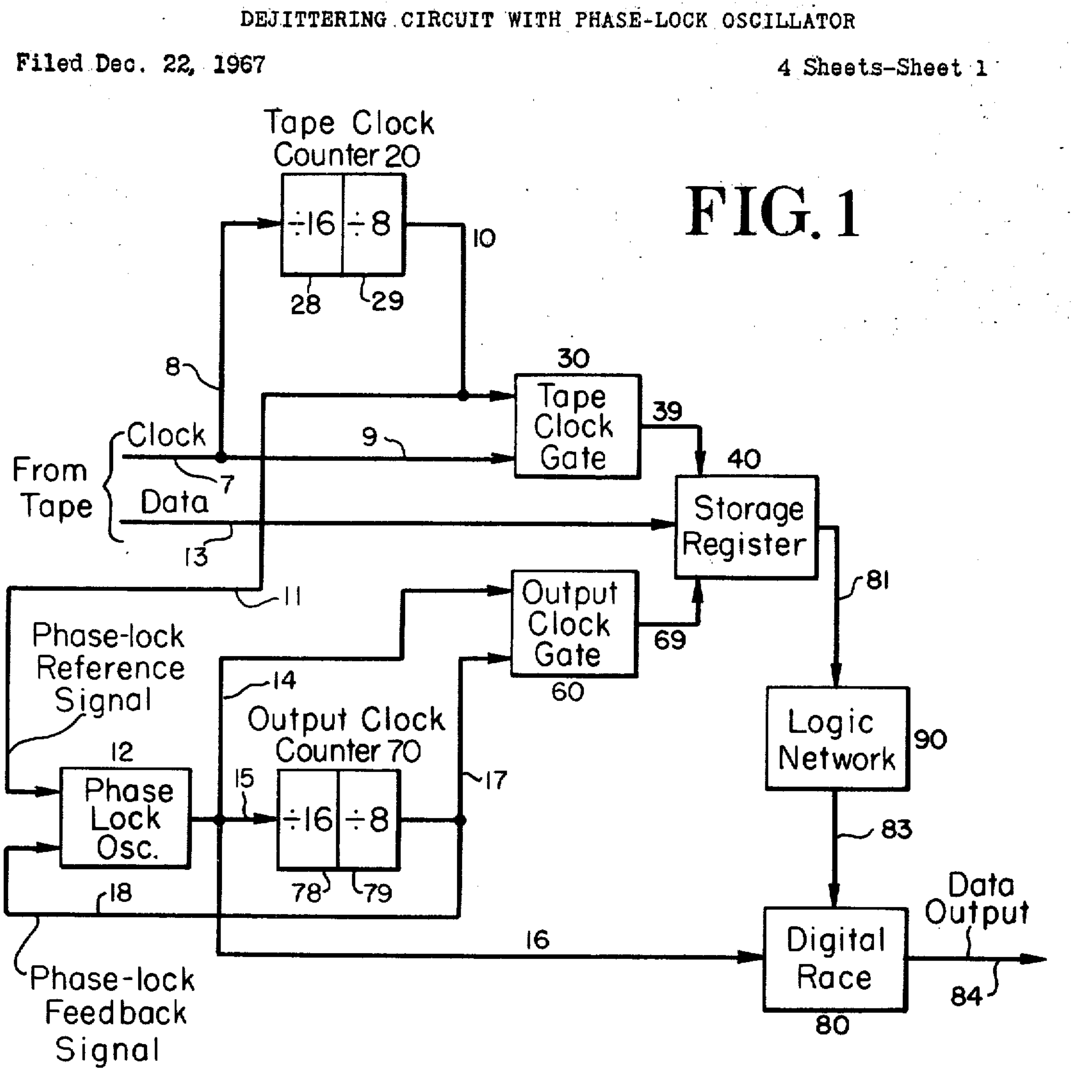
FIGURE 1 is a block diagram, sometimes termed a signal flow diagram, depicting the system of the present invention.

As shown generally in FIGURE 1, clock signals recovered from a magnetic tape are received over an input conductor 7, and passed over conductor 8 to a tape clock counter circuit 20 which includes both a "divide by 16" section 28 and a "divide by 8" section 29. Because this is a signal flow diagram, each line or conductor in FIGURE 1 may represent a plurality of conductors. The tape clock signals are also passed from conductor 7 over a conductor 9 to one input connection of tape clock gate 30. An output signal, at a much lower frequency than the input signal, is passed from tape clock counter circuit 20 over line 10 both to an input connection (actually six conductors) of the tape clock gate 30, and, over line 11 (which represents a single conductor), to the upper input connection of a phase-lock oscillator circuit 12. This input signal to oscillator will be termed the "phase-lock reference signal" hereinafter.

The data pulses recovered from the tape simultaneously with the recovery of clock pulses on line 7 are received in FIGURE 1 over conductor 13 and applied to an input connection of the storage register 40 for storage therein responsive to receipt of an appropriate gating signal, which is the tape clock signal, over conductor 39 (which represents eight conductors) from the tape clock gate 30. As will become apparent from the more detailed description hereinafter, the data bits are clocked out of storage register 40 under the control of a read-out signal received over conductor 69 (also denoting eight conductors) from the output clock gate circuit 60.

An important component of the inventive system is the phase-lock oscillator 12, which applies its output timing or clock signals over conductor 14 to the upper input connection of output clock gate 60; over conductor 15 to the input connection of output clock counter circuit 70; and over conductor 16 to a digital "race" circuit 80. Output clock counter 70 includes a "divide by 16" circuit 78 followed by a "divide by 8" circuit 79. The output signal from counter 70 is passed over conductor 17 (which represents eight conductors) to the lowest input connection of output clock gate 60, and the same output signal from output clock counter 70, designated the "phase-lock feedback signal" in FIGURE 1 and in the following description, is applied over conductor 18 to the lower input connection of phase-lock oscillator 12.

Data passed out of storage register 40 is translated over conductor 81 through a logic network 90 and conductor 83 to the digital race circuit 80, whence it passes over output conductor 84 as a data output signal in which substantially all of the "jitter" or unwanted time displacement of the input pulses as received from the tape have been removed. As will become apparent hereinafter the digital race circuit is not requisite to the basic system of the invention but is employed to provide a noise-free output signal, not subject to high frequency switching transients which might otherwise be imposed if the data readout from the entire system were produced in time coincidence with the pulse readout from the storage register.

DETAILED SYSTEM DESCRIPTION

Figure 2:
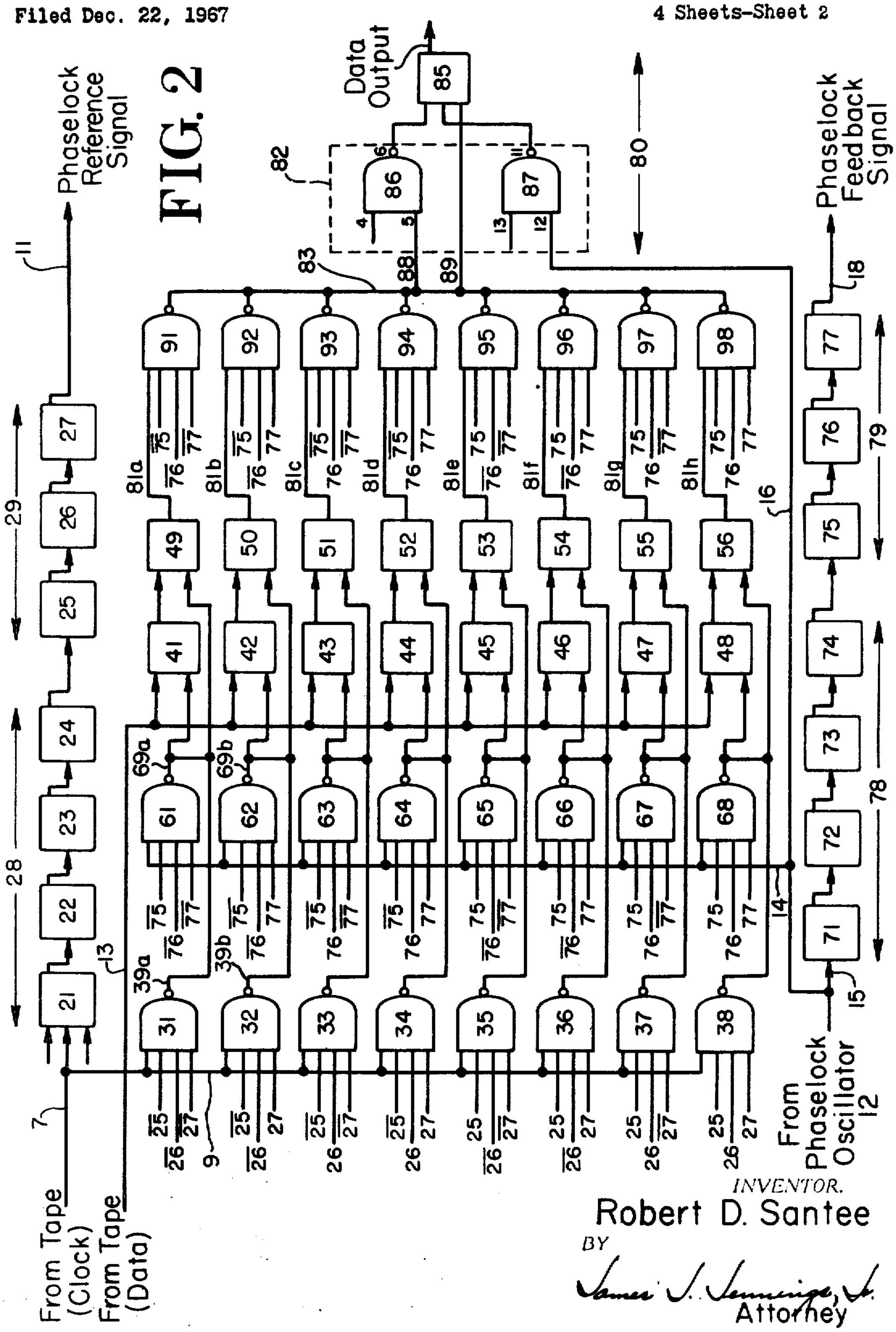
FIGURE 2 is a schematic diagram of the arrangement shown generally in FIGURE 1 except for the phase-lock oscillator.

FIGURE 2 shows a more detailed form of the various components and sub-systems outlined generally in FIGURE 1, except for the phase-lock oscillator 12. The schematic presentation of FIGURE 2 is sometimes termed a logic schematic diagram in that all the gates and connections are illustrated in this showing. For those not familiar with this notation a portion of FIGURE 2 is set out as FIGURE 3 and the brief description thereof will be given by way of familiarization.

Figure 3:
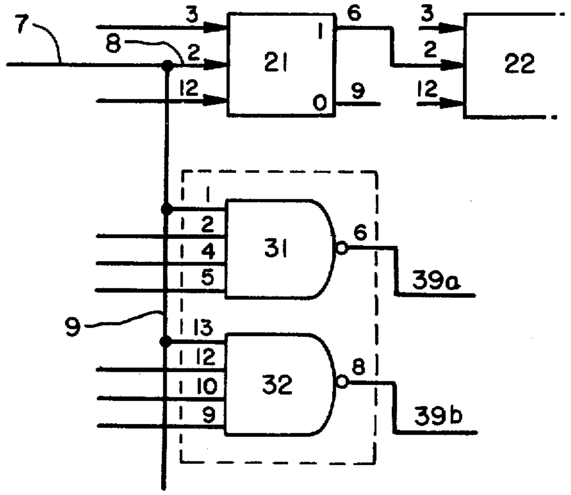
FIGURE 3 is a partial schematic diagram, on a scale enlarged with respect to that of FIGURE 2, useful in understanding the interconnection of the system components.

As shown in FIGURE 3, each stage (such as 21) of the tape clock counter circuit 20 is comprised of a DTL945 cross-connected in the inputs to function as J–K flip-flop. The input connections commonly referenced by numerals 3, 2 and 12 are illustrated in FIGURE 3, together with the output connections numbered 6 and 9.

Another conventional notation of the two output terminals is the 1 and 0 connections. The 1 or upper output connection is always connected into the center input connection of the following stage as shown generally in FIGURE 3. Each stage within output clock counter 70 is a similar flip-flop unit, similarly connected, and the flip-flop stage 85 in the right hand portion of digital race circuit 80 (FIGURE 2) is likewise a DTL945. Those skilled in the art will appreciate that the particular item identified (DTL945) is given by way of illustration only. Other equivalent logic circuitry can be employed when connected to perform the same logic function as that depicted in the drawings.

Similarly, again by way of illustration, the first two gates 31, 32 of the tape clock gate circuit 30 can be comprised of a DTL930, which is a unitary package with both the circuits illustrated within the dashed line in FIGURE 3 therein. The 1, 2, 4 and 5 connections of the DTL930 are utilized as the input connectios to the first gate 31, and the 6 terminal is used as its output connection. The 13, 12, 10 and 9 connections are utilized as the input connections for the second gate circuit 32, and the 8 terminal is connected as the otuput from the gate 92. Similarly gates 33, 34 may be comprised of one DTL930. In the same manner each pair of gates such as 61, 62 in the output clock gate circuit 60 can be comprised of the same package, as can each of the pairs of the NAND gates, such as 91 and 92. In addition the gates 86, 87 shown within block 82 of the digital race circuit 80 can be comprised of a single DTL946 with the appropriate terminal connections as shown in FIGURE 2.

Assuming the system of FIGURE 2 is in operation, clock signals are received from the tape over conductor 7 concomitantly with receipt of tape data signals over conductor 13. Simultaneously timing signals are received from phase-lock oscillator 12 and applied over the conductors 14, 15 and 16.

All the data signals received over conductors 13 are presented simultaneously at the upper input connection of each of the buffer stages 41–48. The wiring of the buffer stages is such that the first eight bits will be received and stored in stage 41 and then succesively shifted into stage 49 as the next eight bits are received and stored in stage 41. Then the bit storage commences in stage 45, so that the third sequence of eight bits is stored in this stage, and the fourth sequence of eight bits displaces the third set from stage 45 for storage in stage 53 as the fourth set of eight data bits is itself stored in stage 45. This operation continues as just described, with successive storage in stages 43, 51; 47, 55; 42, 50; 46, 54; 44, 52; and 48, 56. It is of course not necessary that two successive pairs of storage stages be used, such as the string 41–48 and the successive string 49–56. In the illustrated embodiment this arrangement is chosen because each of the stages 41–48 has a capacity of eight bits and it was desired to provide a 128-bit buffer storage register. Depending upon the amount of bit storage desired and the precise components utilized in the storage register, various configurations of the storage register can be devised.

Considering the gating of the received data pulses into the storage register, the output conductor 39*a* from gate 31 will provide a "load" pulse to one of the stages 41, 49 responsive to simultaneous receipt of the four input pulses. The first of these four pulses is that received over conductor 9 from the tape clock channel and presented simultaneously at the upper input connection of each of the gates 31–38. The second input pulse must be received from the 0 output connection of counting stage 25 in the tape clock gate circuit 20. The notation $\overline{\mathbf{25}}$ is utilized to indicate that the second input connection of gate 31 is wired to the 0 output connection of gate 25, and the notation 25 signifies the 1 output terminal. Similarly the third and fourth input connections of gate 31 are respectively connected to the 0 output connections of stages 26 and 27, as represented by the notation $\overline{26}, \overline{27}$. Note that the input "key" or combination to provide an output signal from gate 32 is different from that of gate 31, in that the last input connection to gate 32 requires that the connection be made to the 1 output connection of stage 27 in the tape clock gate circuit 20. This is equivalent to saying that for an output pulse to issue from gate 32, an input tape clock pulse must be presented on conductor 9, stage 25 must be in the 0 condition, stage 26 must be in the 0 condition, and stage 27 must be in the 1 condition. Similar notation is utilized to indicate the operational sequence of the gates 33–38, and a like notation is utilized to depict the operation of the gates 61–68 in the output clock gate circuit 60 in response to the respective states of stages 75–77 within the output clock counter circuit 70. The same notation is likewise utilized to illustrate the sequence in which the data is clocked through the gates 91–98 of the logic network 90 over the common conductor 83 to the digital race circuit 80.

Figure 4:
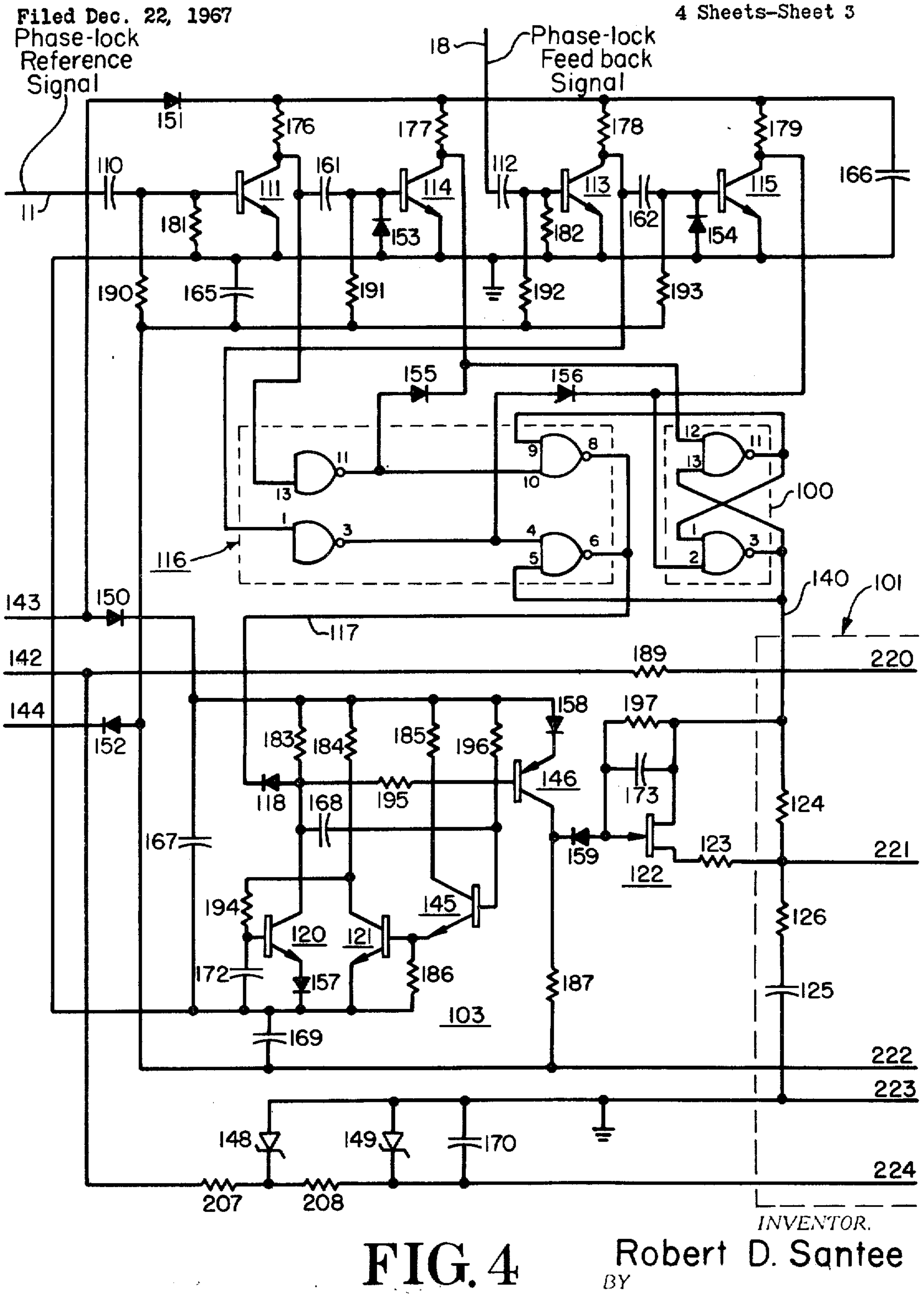
FIGURES 4 and 5 are schematic diagrams which, taken together, show a preferred embodiment of a phase-lock oscillator useful in connection with the inventive system.
Figure 5:
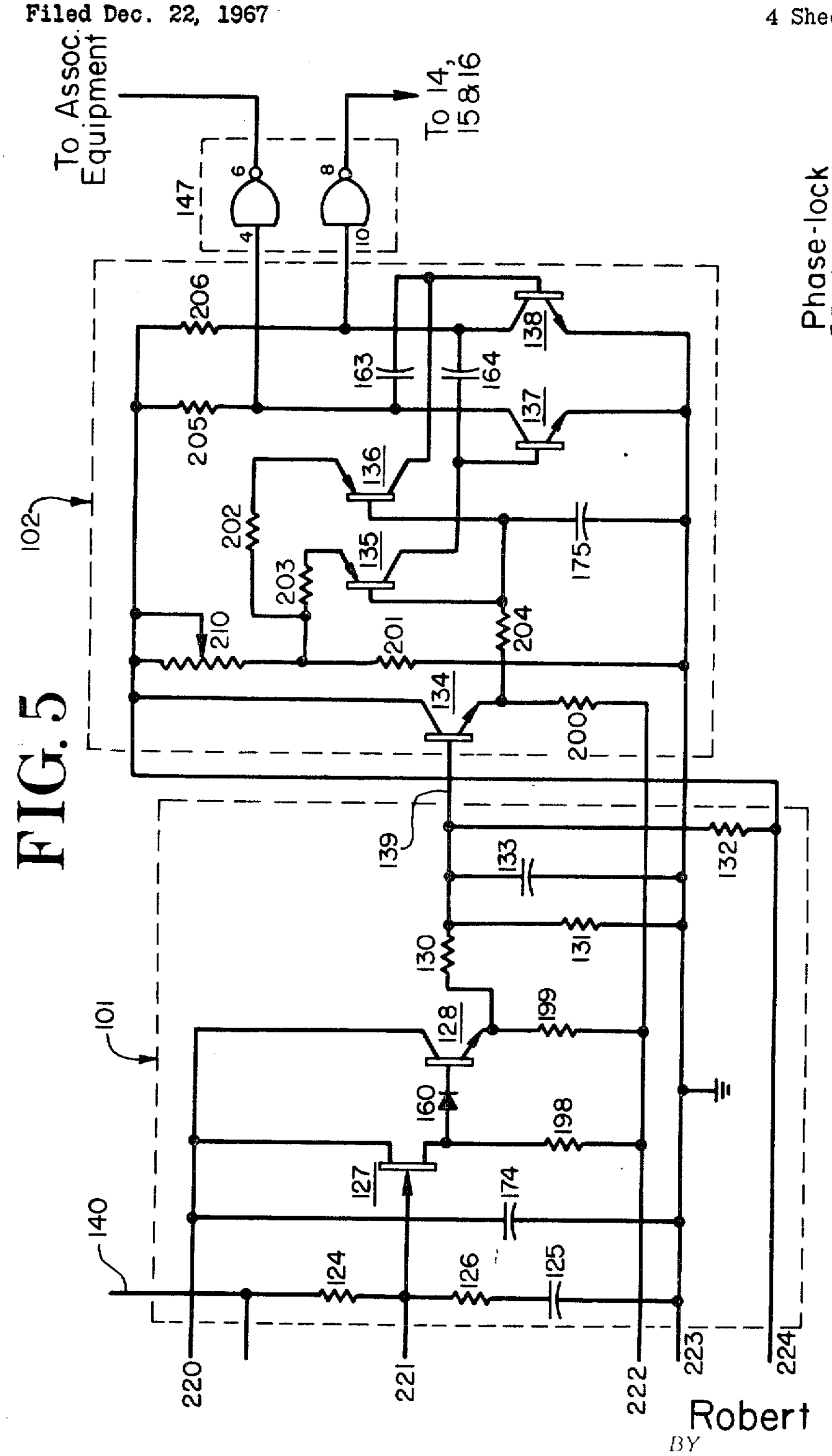

The phase-lock oscillator shown generally as block 12 is depicted in more detail in FIGURES 4 and 5. The phase-lock oscillator comprises three important components: a flip-flop 100, shown in the right central portion of FIGURE 4; a filter 101, shown in the left portion of FIGURE 5; and a voltage-controlled oscillator (VCO) 102 shown in the right portion of FIGURE 5.

In the upper left-hand corner of FIGURE 4 the phase-lock reference signal is shown being applied over conductor 11, through capacitor 110 to the base of an NPN type transistor 111. Those skilled in the art will appreciate that other circuits of this general type can be substituted for the illustrated type. The phase-lock feedback signal is applied over conductor 18 through coupling capacitor 112 to the base of another NPN type transistor 113. These two transistor stages 111 and 113 cooperate with the other stages 114 and 115 to provide appropriate timing of the signals applied to gate circuit 116. The interconnection and function of gate circuit 116 is such that, upon recognizing a loss of phase-lock operation (by comparing the pulses received over conductors 11 and 18), a negative output pulse is passed over conductor 117 and diode 118 to the input side of the single-shot circuit comprising transistors 120, 121 in the start-up circuit 103. Triggering of this single-shot turns on the field-effect transistor 122, shunting the low resistance of resistor 123 across the substantially higher value of resistance in resistor 124 at the input side of filter 101 to effect the rapid charging of capacitor 125. The time delay of the single-shot stage determines the duration of the override period. That is, resistor 123 is switched in by transistor 122 for fast charging of capacitor 125 for the period of the single-shot stage 120, 121. This single-shot stage is triggered when it is detected that either two consecutive reference pulses arrive over conductor 11 without any intervening pulse on feedback conductor 18, or when two successive feedback pulses are received over conductor 18 during a time interval when no reference signal appears on conductor 11. This situation indicates phase-lock is not achieved for normal operation, and there is no alternation between the reference pulses received over conductor 11 and the feedback pulses received over conductor 18.

Filter circuit 101 (FIGURE 5) includes another resistor 126 coupled between resistor 124 and charging capacitor 125. This input portion of the filter is followed by a buffer amplifier comprising transistors 127, 128, and by a second filter circuit including resistors 130, 131, 132 and capacitor 133. The output signal from filter 101 is applied over conductor 139 to buffer amplifier 134 in the voltage-controlled oscillator 102. In this oscillator transistors 135, 136 function as current sources for the voltage-controlled oscillator transistors 137, 138. In a preferred embodiment the center frequency was about a quarter megacycle (more precisely, 244.8 kilocycles), and the typical values given hereinafter are for a complete arrangement operating at that frequency.

Because the complete system of the invention is a closed loop arrangement, it is necessary to set the gain rather low to achieve overall dynamic, closed-loop stability in the phase-lock system. However with no compensation for this low gain, slight drifts at the input side of the voltage-controlled oscillator are reflected as gross changes in the phase angle of the phase-lock oscillator, and in turn this causes gross changes in the duty cycle of the flip-flop 100. Filter 101 affords a very high D-C gain and attenuates the A-C gain. Thus the start-up circuit 103 is provided to obviate the long-time constant, of the order of 10 to 30 seconds, during the start-up time and provides accurate system operation in as little as four seconds after the system is energized. Although the start-up circuit is not requisite either to the phase-lock oscillator or the system as a whole, it does obviate the wait for accurate system operation which would otherwise be caused by the low gain throughout this highly stable system.

Figure 6:
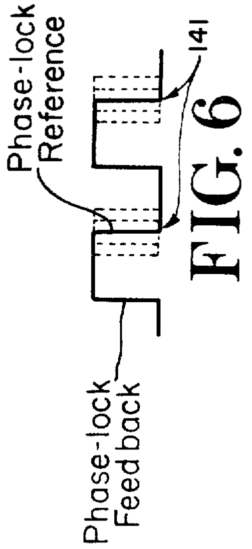
FIGURE 6 is a graphical illustration useful in understanding the operation of the present invention.

Considering now the illustrative representation of FIGURE 6, the phase-lock angle can be viewed by connecting an oscilloscope to portray the waveform of the output signal passed from flip-flop 100 over conductor 140 to the input side of filter 101. The waveform would appear generally as a square wave-representation as indicated in FIGURE 6, with the positive-going transitions of the signal being caused (that is, determined in time) by the phase-lock feedback signal received over conductor 18 and the negative-going transitions of the same signal caused by the phase-lock reference signal received over conductor 11. Nominally the duty cycle of the flip-flop 100 would be equally divided between the positive-going and negative-going transitions, and the duty cycle is representative of the storage register content, that is, the amount of data bits instantaneously stored in register 40. Only 75% of the register, in this embodiment, is actually available for dejittering because data cannot be simultaneously clocked into and readout from the same storage bank. If each storage bank is viewed as one segment of a pile cut into eight equal portions, and the data input is considered at one instant as being along the dividing line between two contiguous segments, then only the remaining six segments or data banks are available for dejittering. The efficiency factor for the dejittering capacity is $(N-2)/N$, where N is the number of storage banks (eight in the illustrated embodiment). With a 128-bit register, when the duty cycle of flip-flop 100 is 50%, this indicates there are 64 bits stored in the register, with an equal amount available to compensate for transient speed up (48 bits) and a similar amount (48 bits) of the register available to compensate for transient slow down. As the instantaneous amount of data stored in the register varies in the removal of "jitter" or undesired time displacement of the data signals, the negative-going transitions of the waveform shown in FIGURE 6 will vary and appear (on the oscilloscope presentation) to fluctuate as referenced generally by the arrow 141 in FIGURE 6.

Solely to assist those skilled in the art to make and use the invention with a minimum of experimentation, and in no sense by way of limitation on the disclosed concepts and arrangements, typical circuit values found operable in the system schematically depicted in FIGURES 4 and 5 are set out below. Different values and different system configurations can be developed by those skilled in the art both for the schematic presentation of FIGURE 4 and 5 and the previously described arrangement of FIGURE 2, to satisfy operation at a different center frequency, different amount of bit storage, and other desired characteristics. The system of FIGURES 4 and 5 was operated with a D-C potential of +25 volts applied to conductor 142, a D-C potential of +5.7 volts applied to conductor 143, and a D-C potential of −5.7 volts applied to conductor 144.

| Component(s): | Identification or value(s) |
|---|---|
| **111, 113, 114, 115, 120, 128, 134, 145** | 2N2222A. |
| **121, 137, 138** | 2N3227. |
| **135, 136, 146** | 2N2907A. |
| **122, 127,** | 2N4393. |
| **116** | DTL946. |
| **100, 147** | DTL946. |
| **148** | IN759A. |
| **149** | IN751A. |
| **118, 150–160** | IN914. |
| **110, 112, 161, 162, 163, 164** | 180 picofarads, 200 volts. |
| **165–170** | 4.7 microfarads, 10 volts. |
| **172, 173** | 100 picofarads, 200 volts. |
| **125** | 1 microfarad. |
| **174** | 1 microfarad, 35 volts. |
| **133** | 10 microfarads, 10 volts. |
| **175** | 1000 picofarads, 200 volts. |
| **176–179** | 4.7 kilohms. |
| **181–187, 131, 132** | 10 kilohms. |
| **189** | 1.5 kilohms. |
| **190–194, 123** | 100 kilohms. |
| **195** | 20 kilohms. |
| **196** | 560 kilohms. |
| **197** | 1 megohm. |
| **124** | 10 megohms. |
| **126** | 470 kilohms. |
| **198** | 3.6 kilohms. |
| **199** | 7.5 kilohms. |
| **130** | 47 kilohms. |
| **200** | 12 kilohms. |
| **201** | 3.9 kilohms. |
| **202, 203** | 5.6 kilohms. |
| **204–206** | 1 kilohm. |
| **207** | 620 kilohms. |
| **208** | 430 ohms. |
| **210** | 0–1 kilohlm. |

Although only a particular embodiment of the invention has been shown and described, it will be apparent to those skilled in the art that various changes and modifications may be made therein without departing from the invention in its broader aspects. Therefore the air in the appended claims is to cover all such changes and modifications as may fall within the true spirit and scope of the invention.

What is claimed is:

1. A dejittering system connected to receive clock signals and data signals from a magnetic tape, comprising:
- a storage register connected to receive said signals from the tape,
- a tape clock counter circuit connected to receive said clock signals from the tape and to produce a phase-lock reference signal,
- a tape clock gate circuit connected to receive said phase-lock reference signal, to receive said clock signals from the tape, and to apply an output signal to said storage register,
- a phase-lock oscillator connected to receive said phase-lock reference signal, and to provide an output synchronizing signal,
- an output clock gate circuit connected to receive said output synchronizing signal from the phase-lock oscillator, and to apply an output signal to said storage register,
- an output clock counter circuit connected to receive said synchronizing signal from the phase-lock oscillator and to apply a phase-lock feedback signal both to said output clock gate circuit and to said phase-lock oscillator, and
- circuit means connected to pass the data signals from said storage register over an output circuit.

2. A dejittering system as claimed in claim 1, in which said storage register comprises a plurality of storage stages, a logic network is coupled to the output stages of said storage register, and a digital race circuit is coupled to said logic network and also to the phase-lock oscillator to receive said output synchronizing signal and pass the data signals over the output circuit.

3. A dejittering system connected to receive clock signals and data signals from a magnetic tape, comprising:
- a storage register having a plurality of storage stages and a plurality of data input connections for receiving said data signals from the tape,
- a tape clock counter circuit connected to receive said clock signals from the tape and to produce a phase-lock reference signal,
- a plurality of tape clock gate circuits connected to receive both said phase-lock reference signal and to receive said clock signals from the tape, and to apply an output signal to said storage register to sequentially load the data signals into the storage register,
- a phase-lock oscillator connected to provide an output synchronizing signal,
- a plurality of output clock gate circuits connected to receive said output synchronizing signal from the phase-lock oscillator,
- an output clock counter circuit connected to receive said synchronizing signal from the phase-lock oscillator and to apply a phase-lock feedback signal both to said output clock gate circuits and to said phase-lock oscillator,
- means for applying said phase-lock reference signal to said phase-lock oscillator,
- means for applying an output signal from said output clock gate circuits to said storage register to sequentially gate the stored data signals out of the storage register, and
- a logic network circuit connected to receive the data signals from the storage register and pass the data signals over an output circuit.

4. A dejittering system as claimed in claim 3 and including a digital race circuit, coupled between said logic network and said output circuit, to minimize transient switching noise in the output data signals.

5. A dejittering system as claimed in claim 3 wherein said tape clock counter circuit includes an input portion for receiving the clock signals from the tape and providing an intermediate signal of reduced frequency, a second portion connected to receive the intermediate signal and for producing a phase-lock reference signal and also producing a plurality of keying signals for application to the tape clock gate circuits to gate the tape data signals into the storage register only when the appropriate combination of keying signals is applied to a particular tape clock gate circuit to load the data bits into the storage register, and the output clock counter circuit includes an input portion for receiving the synchronizing signal and providing an intermediate signal at a lower frequency, and a second portion for receiving the intermediate signal and providing the phase-lock feedback signal and also providing a plurality of keying signals for application to said output clock gate circuits to read out the data bits from the storage register for passage over said output circuit.

6. A dejittering system as claimed in claim 3 in which said phase-lock oscillator comprises a flip-flop stage for operation in response to receipt of said phase-lock reference signal and said phase-lock feedback signal, a filter circuit coupled to said flip-flop stage and including means for establishing a D-C potential which is a function of the times of alternation of the signal received from said flip-flop circuit, and a voltage-controlled oscillator circuit coupled to said filter circuit for providing said output synchronizing signal at a frequency determined at least in part by the amplitude of the D-C potential produced by the filter, thus providing the desired regulation in accordance with the phase-lock reference signal and the phase-lock feedback signal.

7. A dejittering system as claimed in claim 6 and further comprising a start-up circuit, coupled to said filter circuit, for modifying the effective circuit constants in the filter circuit when the system is initially energized to reduce the time required to bring the entire system to normal operation.

References Cited

IBM Technical Disclosure Bulletin, Buffer System, R. R. Skov and E. G. Newman, vol. 2, No. 5, February 1960, pp. 86–89.

RAULFE B. ZACHE, Primary Examiner